April 17, 1951    T. J. SMULSKI    2,549,027
WINDSHIELD WIPER FLUID TRANSMISSION CONNECTION
Filed June 25, 1943
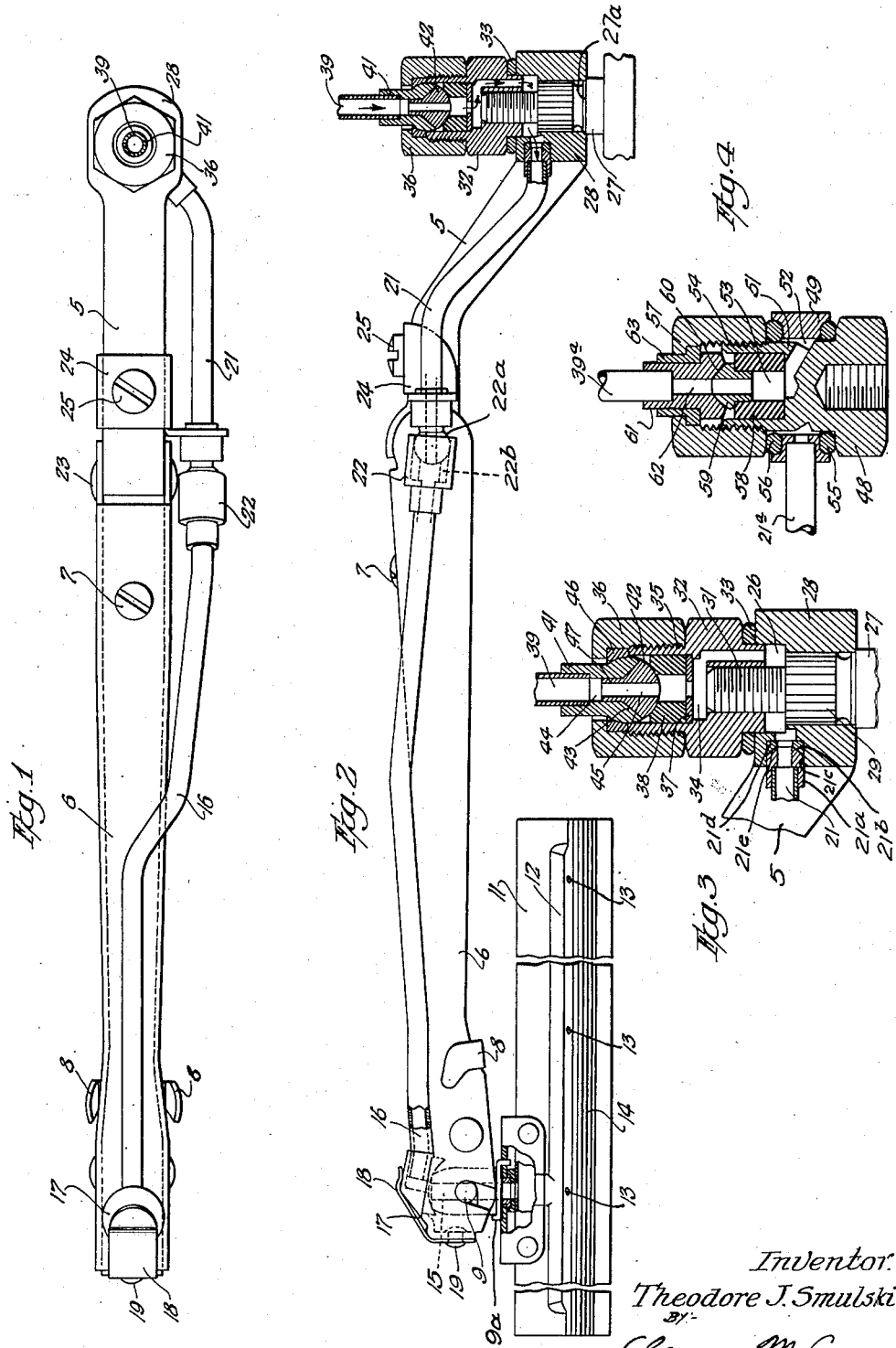
Inventor:
Theodore J. Smulski
By:-
Clarence M. Crews
Atty.

Patented Apr. 17, 1951

2,549,027

UNITED STATES PATENT OFFICE 2,549,027

WINDSHIELD WIPER FLUID TRANSMISSION CONNECTION

Theodore J. Smulski, Gary, Ind., assignor to Productive Inventions, Inc., a corporation of Indiana Application June 25, 1943, Serial No. 492,253

7 Claims. (Cl. 15—250.4)

This invention relates to windshield wiper cleaners of the type which supply a cleaning fluid to the windshield, and more particularly to a fluid-tight joint between two fluid conduits which are movable relative to each other.

Heretofore numerous windshield wiper cleaners have been devised for applying a cleaning fluid to clean, defrost, or deice a windshield of land or marine automotive craft. More recently cleaners of this type have been designed for use on aircraft, and the structure of such cleaners differs from previous windshield wiper cleaners because of various factors which now must be considered in designing such cleaners.

In aircraft windshield wiper cleaners, the wiper arm speed of operation is usually three to four times the maximum speed employed in wiping windshields of earthbound craft. This high speed of operation together with the high velocity of the aircraft has resulted in a wiper design whereby the cleaning fluid is transmitted through a fluid conduit which is a part of the wiper arm to a wiper blade provided with fluid conduits so that the fluid is supplied adjacent the wiping element of the wiper blade whereby the fluid is properly spread across the surface to be wiped.

Furthermore, in aircraft windshield wiper cleaners the wiper arm pressure is many times greater than that encountered in other vehicle wiper cleaners. In view of the necessity to overcome the wind resistance encountered by the velocity of the airplane, the high speed of operation of the wiper, and the great wiper arm pressure, the aircraft windshield wiper actuating mechanism necessarily is of much greater power than that heretofore used on other craft. In view of this, it is undesirable to complicate any part of the windshield wiper motor or the windshield wiper actuating mechanism by causing defrosting fluid to be conducted to the arm and blade by means of a hollow windshield wiper shaft.

In accordance with my invention, I provide a windshield wiper for use on aircraft which supplies cleaning fluid adjacent the wiping element of the windshield wiper blade, and which does not complicate or change in any substantial manner the present construction of windshield wiper motors or actuating mechanisms. This is accomplished by providing between two cleaning fluid conduits, a fluid-tight joint so that there may be relative movement between the two conduits, one of which is usually connected to the cleaning fluid source of supply or reservoir, and the other of which is connected to the windshield wiper arm and blade.

It is an object of my invention to provide a windshield wiper cleaner for aircraft which will supply fluid to the surface to be wiped without requiring any modifications of present windshield wiper motors or actuating mechanisms.

Another object of my invention is to provide an improved windshield wiper cleaner which will permit relative rotational movement between two cleaning fluid conduits.

Another object of my invention is to provide an improved fluid-tight connection in a windshield wiper cleaner arm and blade assembly which will permit a certain amount of variation in the alignment of one fluid conduit with another fluid conduit, particularly where the fluid conduits are movable with respect to each other.

A further object of my invention is to provide an improved windshield wiper cleaner wherein in addition to relative rotational movement between two fluid conduits there will be permitted a certain amount of gyrational movement between the two conduits.

Still another object of my invention is to provide in a windshield wiper cleaner a fluid-tight connection between two fluid conduits which are movable relative to each other so as to facilitate the installation of a wiper cleaner blade and arm assembly.

Other and further objects of my invention subsequently will become apparent.

In the drawing which forms a part of this specification:

Fig. 1 is a view in front, sectional elevation illustrating a windshield wiper cleaner arm and a fluid-tight joint embodying the present invention;

Fig. 2 is a fragmentary view in side elevation, partly in section, of the structure shown in Fig. 1;

Fig. 3 is an enlarged fragmentary, detail cross-sectional view of the fluid-tight joint shown in Figs. 1 and 2; and Fig. 4 is an enlarged fragmentary, detail, cross-sectional view of another embodiment of my invention in fluid-tight joints.

Referring more particularly to Figs. 1 and 2 of the drawing, there is shown a windshield wiper arm having an inner section 5 and an outer section 6 mounted thereon in pivotal relation thereto. The outer section 6 is spring biased about the inner section 5 by suitable spring means which preferably are capable of being adjusted by means actuated through a screw 7 so as to determine the degree of pressure to be applied by the free end of the wiper arm on a windshield wiper blade. While any one of a number of structures may be utilized to accomplish this regulation of the pressure of the wiper arm, a suitable structure for this purpose is shown and claimed in my copending application, Serial No. 382,503, filed March 10, 1941, now Patent No. 2,326,402, August 10, 1943.

The outer free end of the wiper arm section 6 is provided with suitable blade engaging means which may be set in a blade-receiving condition by operation of finger grips 8. A suitable blade engaging mechanism adapted to cooperate with a windshield wiper cleaner blade is shown and claimed in my copending patent application Serial No. 492,252, filed June 25, 1943, for Windshield Wiper Arm and Blade Connectors, which I have signed and sworn to concurrently herewith. This application has matured into Patent No. 2,432,690, dated December 16, 1947. Since the details of such mechanism do not necessarily form a part of the present invention, reference may be made to that application for the details of construction. In order to show the relation of the present invention to apparatus of that type, the apparatus will be briefly described.

A windshield cleaner wiper blade which may be of any of the types suitable for this purpose is provided with a connecter stem including a connector member 9 having trunnions. The connector member 9 is engaged by the mechanism controlled by the finger grips 8 of the wiper arm section 6. Features of the illustrative wiper blade are disclosed and claimed in my pending application, Serial No. 401,951, filed July 11, 1941, for Windshield Wiper. This application has matured into Patent No. 2,348,502, dated May 9, 1944.

The fluid transmission connections exemplified particularly in Figures 3 and 4 of the drawing are disclosed and claimed in my copending application Serial No. 629,651, filed November 19, 1945, now Patent No. 2,520,896, May 17, 1950.

This type of wiper blade 10 has a frame 11 provided on each side with a fluid passage 12. Each fluid passage 12 has spaced apertures 13 positioned adjacent the flexible wiping element 14 so that cleaning fluid will be applied to the windshield adjacent the wiping element and will be spread properly across the surface of the windshield without waste. Each longitudinal fluid channel 12 of the wiper blade frame 11 is connected to a fluid passage 15 extending through the stem of which connector 9 forms a part. In Patent No. 2,348,502, the connector member 9 is rotatively mounted relative to the wiper blade so that, through suitable movement modifying means, the wiper blade can be turned to a limited extent relative to the wiper arm. In the present instance no movement modifying means is provided, and hence provision is made to fix the member 9 against rotative movement relative to the wiper blade. A plate 9a, fixed against rotation, has a forwardly turned lip engaged with a flat face of the member 9 to prevent rotation of the latter.

The fluid passage 15, when the wiper blade is connected to the wiper arm, is in communication with a fluid conduit 16 mounted on the outer arm section 6. The conduit 16 is provided with a suitable terminal portion 17 to provide a fluid-tight joint between the conduit 16 and the fluid passage 15. The fluid conduit terminal portion 17 has a shoulder which is retained in position adjacent the free end of the arm section 6 by a spring clip 18 secured to the end of the arm by suitable fastening means, such as the rivet 19.

The other end of the fluid conduit 16 is separably connected to a fluid conduit 21 which extends along and forms part of the inner arm section 5, by a suitable fluid transmitting universal joint 22. The fluid joint or connection 22 may comprise a ball and socket joint whose center is positioned substantially in alignment with the axis of a bearing rivet 23, through which the two arm sections 5 and 6 are pivotally connected to one another. When the wiper blade is in contact with the windshield, there is little movement of the fluid conduit 16 with respect to the fluid conduit 21, and hence a relatively simple type of joint may be employed. It comprises a metallic ball member 22a which forms a terminal member of conduit 21, and a rubber socket member 22b which is seated in an enlarged terminal portion 22c of conduit 16. Members 22a and 22b are formed with suitable communicating bores. The fluid conduit 21 is supported from the inner arm section 5 by a suitable bracket 24 which is attached to the arm section 5 by fastening means, such as a screw 25. The conduit 21 is desirably affixed to an ear of the bracket 24 which is resilient.

The inner end of conduit 21 has affixed to it a nipple 21a which is formed with a beveled seat 21b. The nipple 21a fits removably into a socket 21c which is formed in the hub portion 28 of inner wiper arm section 5. The nipple bears at its inner end against a suitable sealing gasket 21d which is lodged in the socket 21c, and which is formed with a beveled seat 21e, complementary to seat 21b.

In case of stoppage or of damage to parts calling for service or replacement, the conduits 16 and 21, together with the appurtenant parts, may be readily removed by withdrawing screw 25 and shifting the bracket 24 away from arm section 5. Either the conduit 16 with its appurtenant parts or the conduit 21 with its appurtenant parts may then be repaired or discarded and replaced by a like replacement unit, the parts being then reassembled and secured in place by the screw 25.

In accordance with the invention as more particularly illustrated in Figs. 2 and 3, the inner end of the fluid conduit 21 is connected to communicate with a fluid passage 26 which is formed within that portion of the inner arm section 5 adjacent an actuating shaft 27 of a windshield wiper motor or actuating mechanism. An inner collar portion 28 of the inner arm section 5 is provided with a suitable surface for engagement with a portion of the actuating shaft 27 which may be provided with serrations 29.

The collar portion 28 has a driving fit with the end of shaft 27. The lower end of the collar portion 28 is formed with a beveled shoulder for fitting against a complementary beveled shoulder 27a of shaft 27.

The wiper shaft 27, just forwardly beyond the corrugated portion 29, is provided with a threaded stud portion 31. The stud 31 of the wiper shaft is engaged by a nut member 32 having a depending portion reduced in size and extending part way into an enlarged bore of the collar 28. The fluid passage 26 is defined and bounded by the wall of said bore, the stud 31, a rear face of the nut 32, and a forwardly facing shoulder of shaft 27 which surrounds the base of stud 31. A gasket 33 is interposed between the surfaces of the arm portion 28 and the nut 32 and is clamped firmly by the threading of nut 32 onto stud 31 to provide a fluid-tight joint. The nut member 32 is provided with a fluid passage 34 which is in communication with the fluid passage 26 of the arm portion 28.

The nut member 32 extends upwardly in the form of a reduced hollow end portion 35, such portion being formed with an external thread which is engaged by a collar nut 36. The fluid passage 34 of the nut 32 is separated from the bore formed in the threaded end portion 35 by an apertured plate or washer 37 which seats against a shoulder at the inner or rear end of said bore. The washer 37, in turn, supports a flexible resilient tubular sleeve 38, desirably of rubber, in whose outer end a parti-spherical seat is formed.

A fluid conduit 39 is connected to a suitable source of cleaning fluid, desirably under a moderate pressure. A fluid-tight joint is provided between the fluid conduit 39 and the fluid passage 34 by two members 41 and 42, the member 41 being affixed to the fluid conduit 39, and the member 42 being supported on the resilient sleeve 38. The member 42 and the rear end portion of the member 41 jointly define a sphere segment. The member 42 is of suitable bearing metal and rotatively engages the bearing member 41 to form a liquid-tight joint. The members 41 and 42 are provided with connecting fluid passages 44 and 45 respectively. A self-lubricating bearing 46 is held between the collar of nut 36 and the fluid joint member 41 so that the nut 36, together with the other elements of the fluid joint assembly carried by the shaft 27 may oscillate with respect to the member 41.

The fluid joint members 41 and 42, as previously noted, have an outer parti-spherical configuration, so that the members 42 and 38 have capacity for limited universal rocking movement relative to one another, the rocking being accommodated, however, by deformation of the sleeve 38. This movement between the fluid passage 39 and the other fluid passages will occur if there is any misalignment of the axis of the fluid conduit 39 with respect to the axis of the wiper shaft 27, and it may also occur during operation of the vehicle in response to vibration and other strains.

While the operation of the invention is thought to be evident from the foregoing description, a brief resume of the operation will be given. The fluid conduit 39 is connected to a suitable reservoir or source of cleaning or deicing fluid. The cleaning fluid passes through the conduit 39 into the passage 44 of the member 41, through the passage 45 of the member 42, through the passages in the resilient gasket 38 and the supporting plate or washer 37, through the fluid passage 34 of the nut portion 32, and through the fluid passage 26 of the arm portion 28 to the conduit 21 adjacent the arm section 5. Fluid continues on from the fluid conduit 21 through the fluid conduit 16 to the fluid conduit 15 of the blade connector 9 and to the longitudinal fluid passages 12 of the wiper blade frame 11 to the apertures 13 and on to the surface of the windshield adjacent the wiping element 14 of the wiper blade 10.

The windshield wiper arm is moved through an arcuate path by the wiper actuating shaft 27 so that between the stationary bearing member 41 and the rotary member 42 there is relative oscillatory movement. The member 42 is resiliently pressed against the member 41 by the sleeve 38 at all times.

Reference may now be had to Fig. 4 wherein there is disclosed another embodiment of my invention which differs from the arrangement shown in Figs. 2 and 3. In this arrangement the inner wiper arm does not have a fluid passage in that portion by which the arm section is secured to the wiper shaft. The inner arm section is provided with a fluid conduit 21a which extends adjacent the inner arm section in a manner similar to the fluid conduit 21 in Figs. 1 and 2. The inner arm section is secured to the arm engaging portion of a wiper shaft in a manner similar to that shown and described in and in connection with Figs. 2 and 3, but is further retained in position by a nut portion 48 which engages the threaded stud portion of the actuating shaft.

The fluid conduit 21a is connected to an annular member or ring 49 which surrounds a reduced portion 51 of the nut portion 48. The reduced portion 51 of the nut member 48 may be provided with a circumferentially extending groove or recess so that a fluid passage 52 is formed with the ring 49 which may have an inner diameter slightly greater than the diameter of the reduced portion 51 of the nut member 48. The fluid passage 52 is in communication with a fluid passage 53 which extends within the reduced portion 51. The outer end of the reduced portion 51 of the nut 48 is provided with a threaded portion 54 which is engaged by a collar nut 57. A pair of gasket rings 55 and 56 located in seats at opposite sides of the annular member 49 are firmly clamped by the nuts 48 and 57 to seal the fluid passage 52 and to secure the annular member 49 in place.

The upper portion of the fluid conduit 53 is enlarged, and a flexible resilient supporting sleeve 58, desirably of rubber, is positioned therein to support a fluid joint member 59 which cooperates with another fluid joint member 61. The fluid joint member 61 is secured to a fluid conduit 39a which is adapted to be connected to a supply reservoir or source of cleaning or deicing fluid. A portion of the fluid joint member 61 is surrounded by a self-lubricating bearing 63 having a shoulder portion engaged by the inner shoulder portion of the collar nut 57 so as to retain the joint member 61 in proper operative relation to the joint member 59. The fluid joint members 59 and 61, which have a fluid passage 62 through them, are provided with complementary conical bearing surfaces 60 therebetween.

When the wiper arm is actuated the fluid conduit 39a and the joint member 61 attached thereto remain relatively stationary and the remaining parts shown in Fig. 4 oscillate with respect to these stationary parts. If the axis of the fluid conduit 39a is in alignment with the axis of the nut member 48 the relative movement therebetween will be a simple oscillatory movement. In the event that there is a slight misalignment between the axis of the fluid conduit 39a and the axis of the nut member 48, an additional component will be introduced so as to produce a motion which may be termed to be a relative gyrational movement. This movement is permitted by the flexure or deformation of the resilient flexible mounting gasket 58. A fluid-tight joint is assured between the conical bearing surfaces 60 of the two joint members 59 and 61, the sleeve 58 serving resiliently to press and maintain the member 59 against the member 61.

While I have described what I believe to be the best embodiments of my invention, I do not wish, however, to be confined thereto, but what I desire to cover by Letters Patent is set forth in the appended claims.

I claim:

1. In a windshield wiper cleaning apparatus, in combination, an inner arm section adapted for connection with a wiper actuating shaft, an outer wiper section pivotally supported on the first, and two communicating cleaning fluid conduit sections carried by and extending alongside the respective arm sections, said conduit sections including at their adjacent ends complementary ball and socket joint members whose center of flexure is aligned substantially with the axis of the pivot between the arm sections.

2. In a windshield wiper cleaning apparatus, in combination, an inner arm section adapted for connection with a wiper actuating shaft, an outer wiper section pivotally supported on the first, and two communicating cleaning fluid conduit sections carried by the respective arm sections, said conduit sections including at their adjacent ends complementary ball and socket joint members whose center of flexure is aligned substantially with the axis of the pivot between the arm sections, said ball and socket members being separably engaged with one another, the conduit section carried by the outer wiper arm section having a rearwardly directed terminal portion at its outer end and a shoulder adjacent thereto, and said outer wiper arm section having an opening therethrough which receives and fits said terminal portion and whose margin engages said shoulder, and a spring clip affixed to the outer wiper arm section and bearing against said terminal portion to hold the latter yieldingly and separably in place.

3. In a windshield wiper cleaning apparatus, in combination, an inner arm section adapted for connection with a wiper actuating shaft, an outer wiper section pivotally supported on the first, and two communicating cleaning fluid conduit sections carried by the respective arm sections, said conduit sections including at their adjacent ends complementary ball and socket joint members whose center of flexure is aligned substantially with the axis of the pivot between the arm sections and being removably fitted into sealing engagement, with the respective wiper arm sections at their distal ends, and securing means adjacent the ball and socket members for removably but rigidly affixing one of said conduit sections to the wiper arm section by which it is carried.

4. In a windshield cleaning apparatus, in combination, an inner arm section adapted for connection with a wiper actuating shaft, an outer wiper section pivotally supported on the first, and two communicating cleaning fluid conduit sections carried by the respective arm sections, said conduit sections including at their adjacent ends complementary interfitting joint-forming members whose center of pivotal movement is aligned substantially with the axis of the pivot between the arm sections.

5. A wiper arm comprising inner and outer sections pivotally connected together, a conduit extending alongside said arm sections, separate removable means carried by the inner arm section for securing the inner extremity of the conduit to the inner section, and manually operable resilient means carried by the outer arm section for securing the outer extremity of the conduit to the outer section.

6. A wiper arm comprising an inner section adapted to be connected to a driving means for movement therewith in a predetermined plane, an outer section pivotally connected to said inner section, a conduit attached to said inner section for movement therewith, a conduit attached to said outer section for movement therewith, and means coupling the conduits together adjacent the pivotal connection between said sections.

7. A wiper arm comprising inner and outer sections, means on the outer end of the outer section for detachably engaging a wiper blade, a seat having a port provided on one of said sections, a conduit supported on the arm for transmitting a fluid to the port, and yieldable means for pressing an extremity of the conduit against the seat on said one section to place the conduit in communication with the port.

THEODORE J. SMULSKI.

REFERENCES CITED

The following references are of record in the file of this patent:

UNITED STATES PATENTS

| Number | Name | Date |
|--------|------|------|
| 406,561 | Buchanan | July 9, 1889 |
| 664,291 | Reniff | Dec. 18, 1900 |
| 928,199 | Hoffman | July 13, 1909 |
| 1,656,473 | Darlington | Jan. 17, 1928 |
| 1,801,373 | Stevens | Apr. 21, 1931 |
| 1,868,783 | Williams | July 26, 1932 |
| 2,168,202 | Grantham | Aug. 1, 1939 |
| 2,173,021 | Longwell | Sept. 12, 1939 |
| 2,354,440 | Brown | July 25, 1944 |